United States Patent [19]

Goldowsky

[11] Patent Number: 4,617,448

[45] Date of Patent: Oct. 14, 1986

[54] ELECTRICALLY RELEASABLE LOCKING DEVICE

[75] Inventor: Michael P. Goldowsky, Valhalla, N.Y.

[73] Assignee: North American Philips Corporation, New York, N.Y.

[21] Appl. No.: 682,977

[22] Filed: Dec. 18, 1984

[51] Int. Cl.[4] .......................... H05B 3/58; F16B 2/02; B23P 11/02

[52] U.S. Cl. .................................... 219/200; 148/402; 219/201

[58] Field of Search ............... 219/200, 201, 511, 512; 148/402; 70/182, 183, 184, 282; 403/12, 28, 273; 285/23, 381, DIG. 10

[56] References Cited

U.S. PATENT DOCUMENTS

| | | | |
|---|---|---|---|
| 1,302,502 | 5/1919 | Boswell | 70/182 |
| 3,378,672 | 4/1968 | Blumenkranz | 219/200 |
| 3,883,885 | 5/1975 | Orlando | 148/402 |
| 3,961,853 | 6/1976 | Grimpe | 29/447 |
| 4,244,140 | 1/1981 | Kim | 148/402 |
| 4,412,872 | 11/1983 | Albrecht | 148/402 |
| 4,450,616 | 5/1984 | Morita | 148/402 |

FOREIGN PATENT DOCUMENTS

| | | | |
|---|---|---|---|
| 576711 | 5/1958 | Italy | 70/184 |
| 58-124981 | 7/1983 | Japan | 148/402 |
| 59-118863 | 7/1984 | Japan | 148/402 |
| 1116158 | 6/1968 | United Kingdom . | |

*Primary Examiner*—Clarence L. Albritton
*Assistant Examiner*—Teresa J. Walberg
*Attorney, Agent, or Firm*—David R. Treacy

[57] ABSTRACT

A locking device for holding a movable member of an apparatus rigidly in place during shipment. A locking element is made from a material exhibiting a "shape memory", and is deformed at a temperature below its transition temperature and installed in the apparatus so as to lock the movable member firmly in place. When it is desired to be able to operate the apparatus in a normal mode, the locking element is heated electrically to a temperature above the transition temperature, so that it resumes the original shape and releases the movable member.

13 Claims, 4 Drawing Figures

ELECTRICALLY RELEASABLE LOCKING DEVICE

BACKGROUND OF THE INVENTION

1. Field of the Invention

Many instruments and machines are susceptible to damage by shocks and vibrations which occur only when the instrument or machine is in the inoperable condition. Protection against such shocks and vibrations fall into two categories: first, isolation of the sensitive apparatus from the environmental shock or vibration; and second, changing the internal apparatus arrangement in some way to render it less sensitive to shock and vibration which is actually applied to the apparatus frame. This invention relates to the latter solution.

During launch of a rocket or a rocket-boosted vehicle, shock and vibration levels far higher than 1 g are typically experienced. Isolation for these levels is bulky and heavy, and in some cases not permitted because of alignment requirements, or impossible because of the high acoustic noise levels in the vehicle. For precision instruments which have small clearances or precise surfaces, any relative motion between temporarily touching surfaces can cause severe damage or reduction in operating life or performance. This problem can be particularly troublesome for machines such as a Stirling cycle refrigerating machine which may be used to supercool radiation detectors. Such machines may use advanced piston magnetic suspension techniques, and the performance of these can be impaired by even very small rubbing contacts.

A markedly different situation exists with respect to home or office electronic and entertainment machines. Often these utilize "shipping screws" to immobilize vulnerable moving assemblies. While this expedient can be quite effective and inexpensive, marketing of the apparatus may be greatly aided if set-up can be simplified for the customer.

2. Description of the Prior Art

Stirling cycle coolers, having magnetically suspended pistons or displacers, may use the suspension magnets in a "lock-up" mode, to attempt to hold the moving parts tightly against cylinder walls. However, even apparently microscopic relative movements have been discovered to generate microscopic wear particles, which may clog or reduce the effectiveness of heat exchanger surfaces or lead to additional wear. Because these coolers are hermetically sealed, use of ordinary mechanical locks which are situated substantially outside of the machine itself is impossible.

One common expedient for protecting a sensitive instrumentation against damage when not in the operating condition is found in the field of weighing. Most scales utilize one or more levers which enable a relatively small weight at the end of a long lever arm to balance a heavy weight on a short lever arm. The lever arms themselves are defined by distances from what is typically a "knife edge" pivot. These knife edges are readily damaged by shock loads. Therefore, it is common to provide a means of lifting the lever or balance beam off the knife edge when the scale is not in use. Such devices do not, however, provide much help in solving the problem of the thermodynamic machine such as a Stirling cooler which uses a normally non-contacting bearing, and is designed to be protected from any contact between moving parts.

In the entertainment electronics and office machine field, subassemblies which are hung from the machine frame through a vibration isolator, or large movable subassemblies are often blocked against motion during shipment. In most instances, removable shipping blocks or screws are utilized to prevent relative motion during handling and shipment, and these blocks or screws must then be removed by the user prior to initial operation. However, these techniques usually do not result in a degree of relative-motion protection which would suffice under the severe conditions of a rocket launch. The heavy shock and vibration levels encountered under launch conditions may cause parts, which have apparently been temporarily tightly clamped together, nonetheless to undergo a slight relative movement which results in a microscopic scraping movement between the surfaces which are in contact. Any such effect which occurs with respect to an office machine or a home entertainment apparatus is not likely to produce wear particles that will cause performance or life degradation. However, a satellite cryogenic cooler may have operating clearances of the order of 25 microns (1 milli-inch) between non-contacting surfaces bounding a space which communicates with ultralow temperature heat exchanger surfaces. The slightest debris generation in such a device is apt to reduce the low temperature performance.

SUMMARY OF THE INVENTION

An object of the invention is to provide a locking arrangement, for a member which is movable within the frame of an apparatus during normal operation, which will maintain the member locked rigidly in place through heavy shock and vibration.

Another object of the invention is to provide such a locking device which is structurally simple, highly reliable and compact.

A further object of the invention is to provide a locking device which applies a high clamping force, but can readily be released by the passage of an electric current.

In accordance with the invention, a locking arrangement for locking a member to a frame and then releasing the member so as to be movable with respect to the frame in normal operation, by releasably pressing a locking surface of the locking element against an abutment surface on the member, utilizes a locking element made of a shape memory material, for example of any of the classes described in U.S. Pat. No. 3,832,243. An element made of one of these intermetallic compounds has the property that, when fabricated at a temperature above a transition temperature, and then cooled below that temperature and subsequently deformed to a second shape, the element will maintain that second shape until it is heated above the transition temperature. At the time it is so heated a crystallographic transformation will cause the element to resume its initial shape. More particularly, according to the invention, while above the transition temperature such a locking element is configured in a first shape, and then deformed from the first configured shape to a second shape. While in the second shape the element is installed to the apparatus frame so as to press the locking surface on the locking element against an abutment surface on the movable member in such a way as to lock the movable member against relative movement. The element first shape is configured such that, upon subsequent heating of the element to a temperature above the transition temperature, the locking surface moves away from the abutment surface to allow the member to move in the normal free operation.

In one preferred embodiment of the invention, the locking element is an elongated part having one end attached to the frame, and a locking surface at the far end. At the point of attachment to the frame, the locking element is electrically insulated. A connection for a low voltage, high current supply is made to the end of the locking element near the attachment point, and the current flows through the elongated portion into the abutment surface on the movable member in order to heat the locking element above its transition temperature.

According to a different preferred embodiment of the invention, a heating element is wrapped about an elongated locking element, the locking element being stretched while below the transition temperature to the second shape. This embodiment provides the advantage of a compact, simple construction yet permits use of an electrical supply at convenient voltage and current levels.

According to a further preferred embodiment of the invention, the movable member moves within a cavity in the frame, and has an external surface which is substantially parallel to, and in normal operating condition spaced closely to, a wall of the cavity. The locking element is mounted to the frame at the opposite side of the member, and is arranged so that when the element is in the second shape, it is stretched and displaces the member toward the far cavity wall, pressing the member external surface tightly against the wall. This construction offers the special advantage that very high clamping forces may be exerted without risk of deforming parts, so as to avoid the possibility of galling of the metallic surfaces in the event of very high shock or vibration levels.

According to a still further preferred embodiment of the invention, applicable to apparatus such as a Stirling cycle cooler, the member is a cylindrical element movable axially within a cylindrical cavity, and at least two locking elements are arranged at right angles about the perimeter of the cylindrical element, thereby minimizing any possibility of pivoting of the member about a line passing through a locking element and the opposite surfaces.

According to yet a further preferred embodiment for locking a member which is an elongated cylinder, two locking elements are provided, axially spaced from each other, each oriented radially with respect to the cylindrical member, and having a conical locking surface mating with a respective conical depression serving as the abutment surface for the member. One of the elements is fixed to the frame by an axially oriented fastening, permitting orientation of the locking surface for that element angularly about the member axis; and the other element is fastened to the frame by a circumferentially oriented fastener, to permit axial adjustment of the locking surface of that element, thereby compensating readily for any tolerance differences between the locations of the fastening elements and the conical depressions.

In a different aspect of the invention, an automatically releasable shipping lock arrangement is provided for an apparatus such as a record player or a disc drive. A locking element and member having any of the configurations described above has a heating element electrically connected to an activating circuit, which activating circuit is connected to an energizing circuit for the apparatus. The activating circuit contains a timing means which, upon initial energizing of the apparatus by a user after the apparatus has been unpacked following shipment, will automatically energize the heater for a sufficient length of time to raise the locking element temperature above the transition temperature.

DESCRIPTION OF THE PREFERRED EMBODIMENTS

Figure 1:
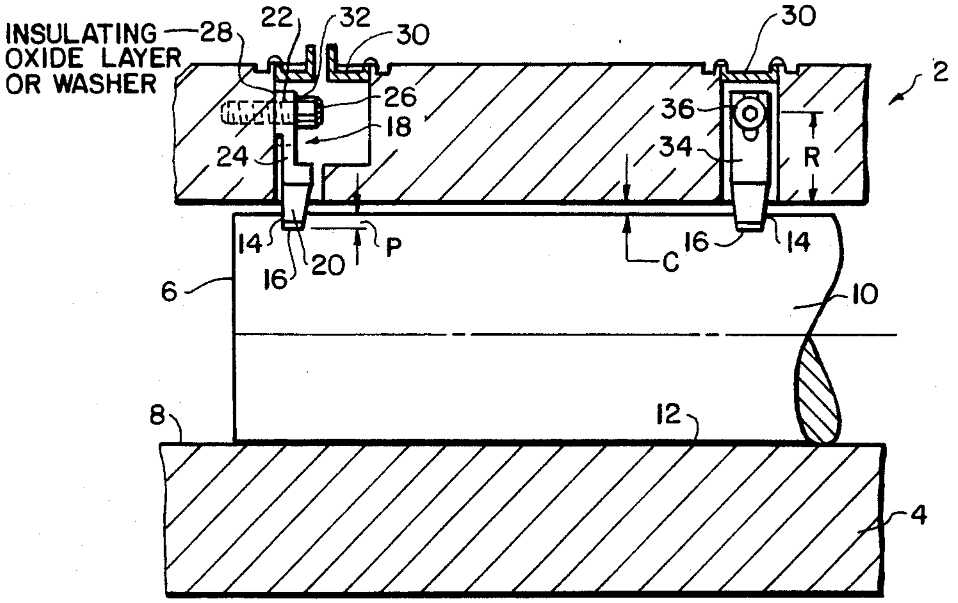
FIG. 1 is a longitudinal section of a portion of a Stirling cycle cryogenic refrigerator, showing a piston locked by an electrically releasable arrangement in accordance with the invention.
Figure 2:
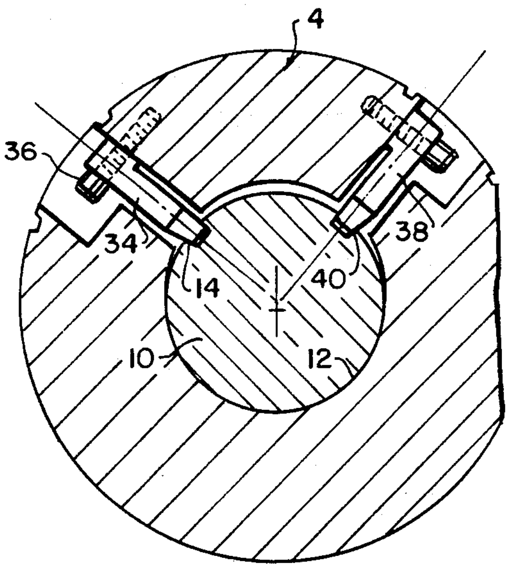
FIG. 2 is a partially diagrammatic cross-section of the arrangement of FIG. 1, showing two angularly displaced locking elements.

FIGS. 1 and 2 show portions of a Stirling cycle cryogenic refrigerator 2, having a hermetically sealed frame or housing 4 surrounding a cavity or cylinder 6 defined by a circular cylindrical wall 8. Within the cylinder an oscillating member or piston 10 is positioned by bearing and motor devices which are not shown, and preferably involve a magnetic bearing system and electric linear drive motor of any of the types known in the art. The piston 10 has an external circular cylindrical surface 12, a portion of which is opposite an abutment surface 14 against which locking is to occur during rocket launching or any other severe shock and vibration exposure of the refrigerator while non-operating. The abutment surface 14 is preferably formed as part of a conical depression 16.

In the locked condition of the refrigerating machine, a locking element 18 having at one end a conical locking surface 20 engages the abutment surface 14 so as to force the piston 10 against the far side of the cylinder wall 8.

The locking element has a frame attachment point 22 toward a second end of the element, separated from the locking surface 20 by a central portion 24. The central portion 24 is spaced from the frame 4 so as to be electrically and thermally insulated from the frame, and in this embodiment is fastened to the frame by a hard anodized aluminum fastening or screw 26 which is oriented axially with respect to the cylinder 6. The frame attachment point 22 of the locking element 18 is also insulated from the frame 4 by an insulating oxide layer or washer 28 between the attachment point and the adjoining surface of the frame 4. To retain hermetic sealing of the refrigerating structure, a hermetically sealed electrical feedthrough 30 is provided above the locking element 18, an electrical conductor 32 providing a path for current to flow directly to the locking element 18.

The locking element 18 is formed from any "shape memory" material such as those described or claimed in U.S. Pat. No. 3,832,243, which is hereby incorporated by reference. For use in a large Stirling cycle machine, which might be used in a satellite, the locking element 18 may be required to hold a relatively massive shaft and piston against the far wall of the cylinder with great force. Typically such a machine might have an average radial clearance of the piston, when operating, as small as 25 microns (1 milli-inch) so that when the piston is being locked there is a total clearance C on the locking element side of 50 microns (2 milli-inches). Allowing an initial engagement or depth of penetration P of the locking surface of 500 microns (20 milli-inches), and seeking to obtain a clearance of 150 microns (6 milli-inches), of the locking surface 14 behind the cylinder wall in the retracted condition, a maximum radial length R from the attachment point 22 to the locking surface 20, in the retracted shape, is $17\frac{1}{2}$ mm (0.7 inch). Such a locking element may be made readily from a shape memory material selected to have a desired transition temperature of 50° C., at which it undergoes a martensitic transformation as described in the U.S. Pat. No. 3,832,243. If the locking element is machined to the dimensions described above, at a temperature above 50° C., and then cooled below 50° C. and stretched 4% of its central portion length, such a locking element may be stored and then installed at normal working temperatures which are below 50° C. The locking element is pressed forcefully into the position shown in FIG. 1, and the electrical feedthrough is then sealed. A satellite containing the refrigerating machine is then prepared for launch, and launched while maintaining the environmental temperature around the refrigerator at no more than 50° C. After launch, a high current, low voltage power supply is connected to the electrical conductor 32, so as to pass current through the central portion of the locking element, which is both thermally and electrically insulated from the frame 4, into the abutment surface 14 of the piston, and through the piston into the frame 4. As a result, the central portion of the locking element will be heated to a temperature above 50° C., and will undergo the transformation which causes it to revert from the second, stretch deformed shape, to the original shape, thereby retracting the locking surface below the cylinder wall. This enables the magnetic bearing system then to suspend the piston within the cylinder, so that the machine may be operated.

Where such a piston is relatively long, good locking requires the use of two or preferably at least three locking elements. As shown in FIG. 1, a second locking element 34 is axially spaced from the first locking element, and is fastened to the frame 4 by a circumferentially oriented screw 36. In all other respects the element 34 is formed and connected as the element 18. With this arrangement, when installing the locking element 34 it is permitted to position itself rotationally about the screw 36 so as to accommodate tolerance build-ups between the axial spacings of the conical depressions 16 and the attachment points of the two locking elements. At the same time, the axial orientation of the screw 26 for the locking element 18 permits orientation of that element to accommodate relative angular misalignment of the two locking elements and the depressions in the piston.

Any possible twisting or rubbing of the piston against the far cylinder wall is further reduced by using a third locking element 38, such as shown in FIG. 2. This element is oriented 90° around the circumference of the cylinder from the element 34, so as to reduce any tendency of the piston to rotate about the conical surface of the element 34, thereby eliminating a rubbing action between the external surface 12 of the piston and the cylinder wall 8.

Figure 3:
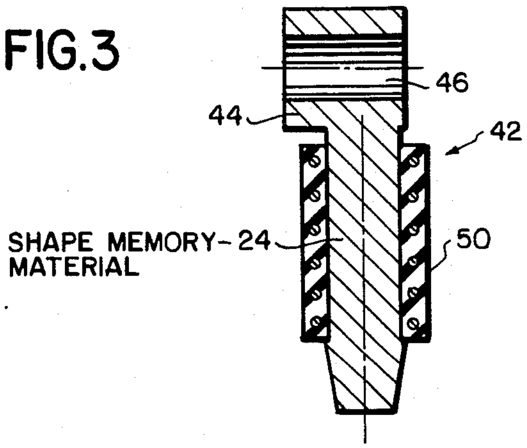
FIG. 3 is an enlarged sectional view of a locking element having a wrap-around heating element.

FIG. 3 is a sectional view of another embodiment of a locking element 42, which permits use of an electrical heating supply provides only a low current. The frame attachment point is provided by a boss 44 having a hole 46 formed through it for an attachment screw. The boss 44 extends a sufficient distance transversely from the axis of the central portion 24 to allow clearance for a heating element 50 which is wrapped about the central portion. For use as described below, in applications where outgassing is not important, the heating element may economically be any commercially available type, such as may use a heating wire wrapped around the central portion, and arranged and protected by a silicone rubber or other thermally conducting coating or layer. Alternatively, for use in a hermetically sealed cryogenic refrigerator, the heating wire is contained within a thin wall stainless steel tube which is wrapped around and may for example be soldered to the central portion of the locking element.

Figure 4:
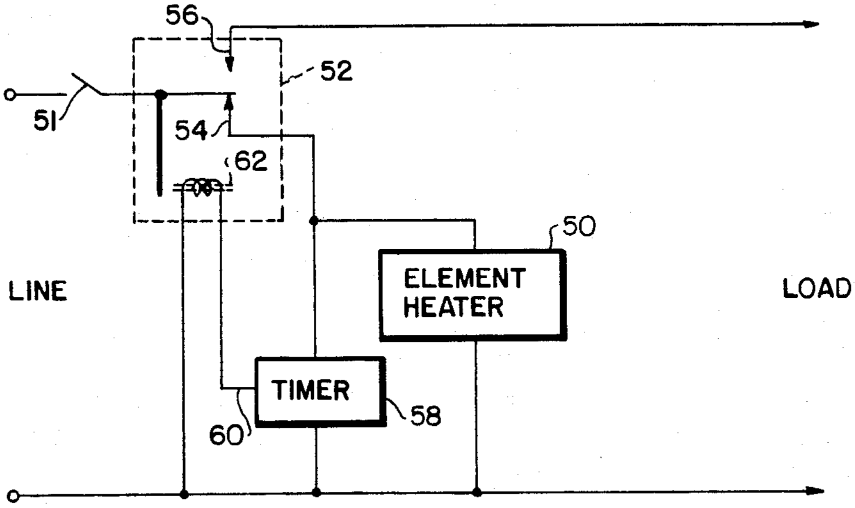
FIG. 4 is a block diagram of a circuit for automatically releasing a shipping lock arrangement of an electrical apparatus.

A markedly different application of the invention in the field of office or home electrical apparatus utilizes the circuit shown in FIG. 4. To permit a locking element, for example such as that shown in FIG. 3, to immobilize a rotating or movable assembly which would be susceptible to damage due to shipping shock and vibration, this circuit provides automatic reversion to the operating mode the first time a customer energizes the apparatus. As shown in FIG. 4, the line switch 51 of the apparatus is connected directly to the movable contact of a latching relay 52, whose normally open contact is connected to the normal electrical load or circuits of the apparatus. As shipped to the customer, the energized circuit connects from the line through the normally closed contact 54 to the element heater 50 of the locking element or elements in the apparatus. An automatic resetting timer circuit 58 is connected in parallel with the element heater 50. This circuit may be of any well-known type which will provide an output at a terminal 60 when the timer has been energized for the predetermined period of time, which in this case is a period somewhat longer than that which will be required to raise the locking element temperature above the transition temperature for the particular shape memory material utilized. A resetting timer is used, so that if the customer should close the line switch 51 for too short a period of time for the elements to be heated and released, continuous current flow through the element heater is assured the first time that the line switch 51 is turned and left on. The output terminal 60 is connected to a relay coil 62 which causes the movable contact to be transferred to the normally open contact 56. The relay is then latched permanently in that position, for example by a mechanical latch or by providing a small permanent magnet as part of the core of the relay coil 62. With this connection it is then assured that the element heater will not be energized, and the time for its operation lost, during each successive period of operation of the apparatus.

It will be clear to those of ordinary skill in the electro-mechanical arts that many other embodiments and applications of this invention are feasible, and that therefore the scope of the invention should be measured only by the following claims. For example, shape memory materials are available for a relatively wide range of transition temperatures, including all those described in the U.S. Patent referred to previously, as well as many intermediate temperatures achieved by varying the percentages of the different metals in the alloy. The shape memory element can have many other configurations besides that of a straight pin, and can be deformed by bending, twisting, or compressing as well as by stretching, below the transition temperature, while still returning to the first shape at which it was fabricated above the transition temperature.

When used with an automatic, first-time-activating circuit, it is of course not required that the element heater be disabled from the circuit after it has released. Further, rather than using the simple latching relay described with respect to FIG. 4, a purely electronic switch may be used, or it may be feasible to permit energizing the load circuits in parallel with the element heater. After the element heater has caused the locking element to release, a circuit may be used to determine that the apparatus has now commenced normal operation, and its sensing of normal operation can readily be caused to disconnect the element heater connection. Thus, it will be clear that many different electrical and mechanical uses of the invention fall within its scope.

What is claimed:

1. An electrically releasable locking arrangement, comprising:
- a frame,
- a member mounted to be movable with respect to said frame, and having an abutment surface, and
- means, including a locking surface, engaging said frame for releasably pressing the locking surface against the abutment surface, arranged such as to prevent relative movement of said member with respect to the frame,
- characterized in that said means comprises:
- a locking element made of a shape memory material having a given shape transition temperature higher than a selected temperature at which the arrangement is to remain locked, deformed below said given temperature from a first shape to a second shape in which the locking element presses the locking surface against said abutment surface so as to lock the member against relative movement with respect to the frame; said element being so arranged with respect to the frame and the member that, when the element is in said first shape, said locking surface is spaced from said abutment surface such that the member is free to move with respect to the frame, and
- means for heating said element to raise the temperature of the element above the transition temperature,
- whereby upon activating said means for heating, the element will undergo transition from the second shape to the first shape and will release the member.

2. An arrangement as claimed in claim 1, characterized in that said means for heating comprises means for electrically insulating said element from the frame, and means for passing current through a series current path including the element and the location of abutment of the element against the abutment surface.

3. An arrangement as claimed in claim 1, characterized in that said element has an elongated central portion between a frame attachment point and said locking surface, and in said second shape said central portion is stretched in the length direction compared with said first shape.

4. An arrangement as claimed in claim 3, characterized in that said means for heating comprises an electrically insulated heating element wrapped about said central portion.

5. An arrangement as claimed in claim 1, characterized in that
- said frame has a cavity within which said member is at least partly disposed, the cavity having a wall and the member having an external surface substantially parallel to each other, in normal operating condition said wall and said surface being spaced from each other,
- said abutment and said external surface are on opposite sides of the member, and
- said locking element is mounted to said frame so that, when the element is in said second shape, the element displaces the member toward said wall and presses said external surface against the wall.

6. An arrangement as claimed in claim 5, characterized in that said element has an elongated central portion between a frame attachment point and said locking surface, and in said second shape said central portion is stretched in the length direction compared with said first shape.

7. An arrangement as claimed in claim 6, characterized in that said means for heating comprises an electrically insulated heating element wrapped about said central portion.

8. A releasable locking arrangement for preventing launching damage to an apparatus having a member movable with small clearances inside a hermetically sealed frame, comprising
- a frame having a cavity defined by a wall,
- a member arranged within the cavity, having an external surface, in a normal operating position said external surface having a small clearance from said wall, said member having an abutment surface at a side opposite said external surface,
- a locking element made of a shape memory material having a given shape transition temperature higher than a selected temperature at which the apparatus is maintained prior to and during launch, deformed below said temperature from a first shape to a second shape, so arranged within and engaging said frame that, while in the second shape, a locking surface of said locking element presses against said abutment surface so as to displace the member from the normal operating position and to hold said external surface against said wall with a force exceeding the peak launch vibration force; said element being so arranged that when the element is in the first shape the locking surface is spaced from the abutment surface when the member is in the normal operating position, and
- hermetically sealed means for heating said element to raise the temperature of the element above the transition temperature,
- whereby upon activation of said means for heating, the element will undergo transition to the first shape and release the member.

9. An apparatus as claimed in claim 8, characterized in that said member has a circular cylindrical shape; the cavity has a circular cylindrical shape which is coaxial with the member in the normal operating condition, the member has two said abutment surfaces spaced orthogonally about the circumference of the member; and the apparatus comprises two said locking elements each being elongated in a radial direction, in the second shape each element being stretched in the radial direction and being arranged opposite a respective abutment surface.

10. An apparatus as claimed in claim 8, characterized in that:

said member is an elongated cylinder, the apparatus comprises two said locking elements axially spaced from each other, each element being elongated in a radial direction as a result of said deformation from the first shape to the second shape, each of said abutment surfaces is a conical depression in the member, and each of said locking surfaces is a conical inward end of the respective element, one of said elements is fixed to the frame by an axially oriented fastening so as to permit orientation of the respective locking surface angularly about the axis of the member, and said other element is fastened to the frame by a circumferentially oriented fastener so as to permit axial adjustment of the locking surface of the second element.

11. An automatically releasing shipping lock arrangement for an electrical apparatus, comprising:

a frame, a member mounted to be movable with respect to said frame, and having an abutment surface, a locking element made of a shape memory material having a given shape transition temperature higher than apparatus storage and shipping temperatures, deformed below said transition temperature from a first shape to a second shape, so arranged within and engaging said frame that, while in the second shape said locking surface is pressed against said abutment surface so as to lock the member against relative movement with respective to the frame; said element being so arranged that when the element is in the first shape the locking surface is spaced from the abutment surface, means for heating said element to raise the temperature of the element above said transition temperature, means for energizing said apparatus for normal operation, and means for activating said means for heating upon first activation of said means for energizing after shipment of the apparatus.

12. An arrangement as claimed in claim 11, characterized in that said element has an elongated central portion between a frame attachment point and said locking surface, and in said second shape said central portion is stretched in the length direction compared with said first shape.

13. An arrangement as claimed in claim 12, characterized in that said means for heating comprises an electrically insulated heating element wrapped about said central portion.

* * * * *